United States Patent
Laydera-Collins (10) Patent No.: US 9,856,666 B2
(45) Date of Patent: Jan. 2, 2018

(54) BOTTOM OF POOL CLEANING DEVICE

(71) Applicant: Imack Laydera-Collins, Benton, LA (US)

(72) Inventor: Imack Laydera-Collins, Benton, LA (US)

(*) Notice: Subject to any disclaimer, the term of this patent is extended or adjusted under 35 U.S.C. 154(b) by 0 days.

(21) Appl. No.: 15/147,165

(22) Filed: May 5, 2016

(65) Prior Publication Data

US 2017/0321441 A1    Nov. 9, 2017

(51) Int. Cl.
*E04H 4/12* (2006.01)
*E04H 4/16* (2006.01)
*C02F 1/00* (2006.01)
*B01D 29/23* (2006.01)
*C02F 103/42* (2006.01)

(52) U.S. Cl.
CPC ........... *E04H 4/1218* (2013.01); *B01D 29/23* (2013.01); *C02F 1/008* (2013.01); *E04H 4/1236* (2013.01); *C02F 2103/42* (2013.01); *E04H 4/1636* (2013.01)

(58) Field of Classification Search
CPC ... E04H 4/1218; E04H 4/1236; E04H 4/1636; C02F 2103/42; B01D 29/23
USPC ............. 210/167.01, 167.1, 167.16, 167.17; 15/1.7
See application file for complete search history.

(56) References Cited

U.S. PATENT DOCUMENTS

| 3,932,281 A * | 1/1976 | Pansini | E04H 4/1236 15/1.7 |
| 3,961,393 A * | 6/1976 | Pansini | E04H 4/1618 15/1.7 |
| 4,950,393 A * | 8/1990 | Goettl | E04H 4/1681 134/167 R |

\* cited by examiner

*Primary Examiner* — Fred Prince (57) ABSTRACT

The present invention consist of an improved and very compact hand held pool debris removal system using a hydrodynamic water circulation device capable of producing significant water flow through a conduit. Such water flow is then used to lift and convey debris from bodies of water such as fountains, ponds and swimming pools. The device operates by creating a high speed water jet curtain using an external source of energy by means of pressurized water, which impinges on an steady body of water transforming the energy provided by the external water source into a strong flow capable of lifting and conveying light and heavy debris from the floor of bodies of water and forcing these debris into a fine mesh filter for retention and later disposal.

19 Claims, 10 Drawing Sheets

BOTTOM OF POOL CLEANING DEVICE

BACKGROUND OF THE INVENTION

The art of removing debris or materials from the bottom of bodies of water is quite old. The obvious answer to the problem has been to utilize a suctioning device that creates a large and strong stream of water which can be directed to the areas where the debris is deposited. Then the debris is transferred to a filter or dumped out of the body of water with the water stream. Based on these premises the ideal bottom of pool debris removing device is one with sufficient water speed to carry or lift heavy debris such as rocks, pebbles or sand, and with enough water flow to allow a large entry area for oversize debris such as leaves, pine cones, branches etc. Unfortunately, residential pool owners cannot afford the cost and maintenance of a perfect system, therefore, part of the removal is done with nets for large debris and water suctioning means for smaller debris. Among the suctioning means for retrieving small size debris, the most widespread are those attached to a hose which is connected to the pool water return system. These systems are quite effective but limited to pools with medium to large water pumps and filtration systems. Another popular system are the so called cleaning robots. These robots use the positive pressure water circulation system to create a jet water induction system inside the robot. Then the water stream mixed with small debris is deposited in a very permeable reservoir inside the robot housing. These robots randomly navigate the bottom of the pool and a low velocity and flow is sufficient to remove light and semi-buoyant debris since it operates for a large period of time. Same as the suction hose, these robots need to operate with water circulation systems found only in medium to large size pools.

There is another category of bottom of pool cleaners which are hand held and use an external source of pressurized water such as a water spout to create a water induction system by punctual water jets. This later class is used on low cost pools and spas. They operate similar to the aforementioned robots, using a water stream inductor to create the stream of water used to move the bottom deposited debris into a very permeable filter. Since these water inducing pool cleaners need to rely on a limited water flow and pressure provided by a residential water spout, the size of the inductor inlet is limited. Due to this limitation some of these debris removers are dedicated to remove large semi-buoyant debris, but not heavy debris. On the other hand, if they are designed to remove heavy debris, they are fitted with a small water stream inlet which takes a lot of time and strokes. The lately also limits the size of debris to be removed and often gets clogged. Typically small pools are outfitted with fractional horsepower water circulation systems not suitable to use water suction hose or cleaning robots systems, leaving them with the only alternative of hand held devices such as nets or externally powered water circulation systems. Therefore, there is a need for an effective and affordable bottom of the pool debris removal system for those using fractional horsepower circulation systems mainly found in above ground pools.

BRIEF DESCRIPTION OF THE INVENTION

The limitations and disadvantages associated with the prior art are overcame by the present invention of a hand held simple, inexpensive and effective submersible debris removal system that can be used for any type of water body requiring debris and foreign solids removal. The hand held debris removal device object of the present invention is very compact, powerful and effective due to the fluid dynamics principles utilized to maximize the energy provided by residential water flow rates and pressure, and convert that energy in a water displacement system that is efficiently utilized to convey a substantial velocity to a mass of steady water through a small conduit. In that manner the hand-held pool cleaning device object of the present invention uses the velocity created by a conical high speed water jet curtain to accelerate the steady water at speeds capable of effectively dragging debris, sand, small rocks from the bottom of bodies of water such as pools, spas, ponds and aquariums and creating sufficient pressure to convey the water through a fine mesh filtration system leaving the debris deposited into a retrievable and reusable container. Unlike the portable water jet powered devices in prior art, the device object of the present invention is capable of using micro-porosity media or paper filters similar to those used on high end pool filtration systems; the main enabler is the higher level of water pressure inside the filtration media capable of overcoming the permeability resistance.

To better understand the advantages of the device of the present invention over the prior art, it is necessary to understand the hydrodynamic theory behind it. If we simplify the complex fluid dynamic calculations involved on water jets behavior, and the Boyle's equation for conservation of energy on gasses, we could establish that water jets have certain energy expressed in a momentum which is directly proportional to the liquid mass and the speed. To transmit that energy to a steady body of water, there must be an exchange of momentum between the water jet and the steady mass of water. If we discard the slippage and the friction loses, and assumed a high degree of mixing, the momentum of the supply source and the induced current, should remain the same by the law of conservation of energy. Utilizing a modified version of Boyle's equation, we will learn that:

$$V_2 * P_2 = V_1 * P_1 * f * e$$

Where $V_1$ is the volume of water supplied to the inductor, $P_1$ is the supply water pressure at the inductor inlet, V2 is the induced stream volume, $P_2$ is the induced stream pressure, "f" is the friction factor inside the inductor and "e" is the efficiency factor or fraction of the hydraulic momentum transmission between the high speed water jet curtain and the steady body of water.

Therefore, the total flow rate of water through the inductor ($V_2 * P_2$) is highly dependent on the water supply flow and pressure. But even more dependent on the magnitude of the friction losses and the efficiency of hydraulic energy conversion between the high speed water jet curtain and the steady body of water. Here is where the present invention departs from the prior art devices. The "f" and "e" factors are much smaller in punctual water jets induction systems due to higher pressure loses and poor inter-mixing of the high speed water jet particles with the steady stream due to the limited contact area of the high speed single point jet with the steady fluid surface area around the jet. To improve that mixing ratio, many have tried multiple jets, but then friction losses start consuming the available energy and reducing the efficiency due to the increase of friction on the contact area at the nozzles. Since the energy available to produce a substantial induction over a stream of water is restricted to the flow and pressure available at residential water spouts, that energy transformation must be as efficient as possible to obtain the desired water speed and pressure required for lifting and filtering small and heavy debris. Of course most of the pressure at the exit of the water induction system is in the form of what is called velocity pressure. According to Bernoulli's laws a water stream total pressure is the addition of the Static Pressure and The dynamic Pressure. In order to maximize that pressure it is necessary to limit the flow of the total induced stream to practical values which are proportional to the available flow and pressure of the pressurized water supply in a ratio of about 5:1. The skilled in the art who is knowledgeable of the principles of fluid-dynamics on water jets, will understand how the high pressure water jet curtain used in the present invention is capable of achieving a greater contact surface between the high speed particles of water and the steady particles of the resting fluid, therefore more available energy is utilized to accelerate the steady water stream. Secondly, the pressure losses around an uninterrupted peripheral nozzle are significantly smaller than a large number of smaller single source jets, therefore allowing more energy to be utilized to transfer momentum to the induced water stream. Based on experimental data and as is expected, the nozzle gap, direction and area reduction design are very sensitive to a point where small variations from the ideal state will render the device ineffective.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages according to the present invention. Advantages of embodiments of the present invention will be apparent from the following detailed description of exemplary embodiments thereof, which should be considered in conjunction with the accompanying drawings in which.

DETAILED DESCRIPTION OF THE INVENTION

Detailed embodiments of the present invention are disclosed herein; The portable pool debris removal system object of the present invention is configured using the same basic elements of similar prior art pertaining to hand held portable pool cleaners: A pole, a water inductor, a collection bag and a pick up nozzle. The main difference separating the present invention from similar prior art devices is the novel water induction system utilized and the type of filtration media that could be utilized as a result of a higher outlet water pressure. As we will learn in the foregoing description, the water induction system consisting of a high speed water jet curtain coupled with an efficient pick-up nozzle and a very fine mesh debris collection reservoir can provide features not achieved by prior art devices of the same class shown by FIGS. 1a, 1b, 1c and 1d.

Figure 1A:
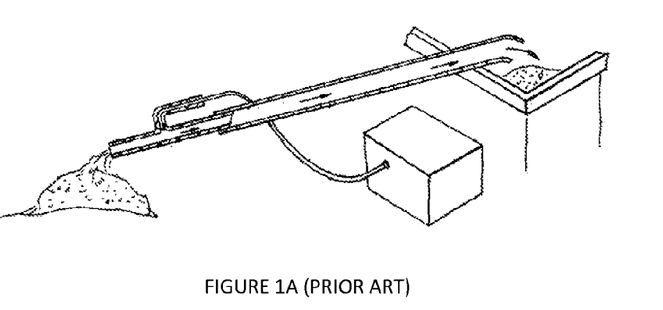
FIGS. 1a, 1b, 1c, and 1d describe prior art devices using single point water jets to create water motion.
Figure 1B:
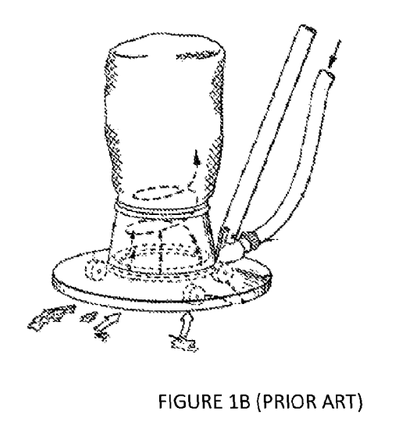
Figure 1C:
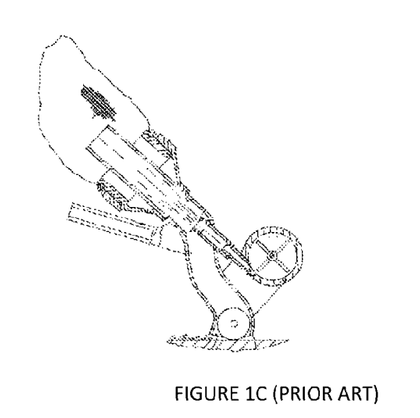
Figure 1D:
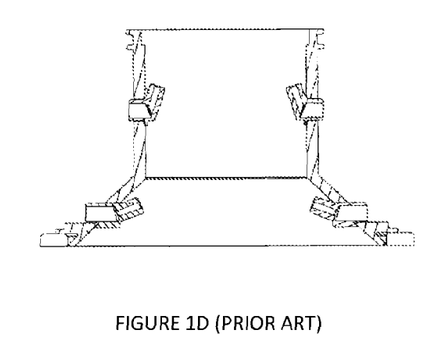
Figure 2A:
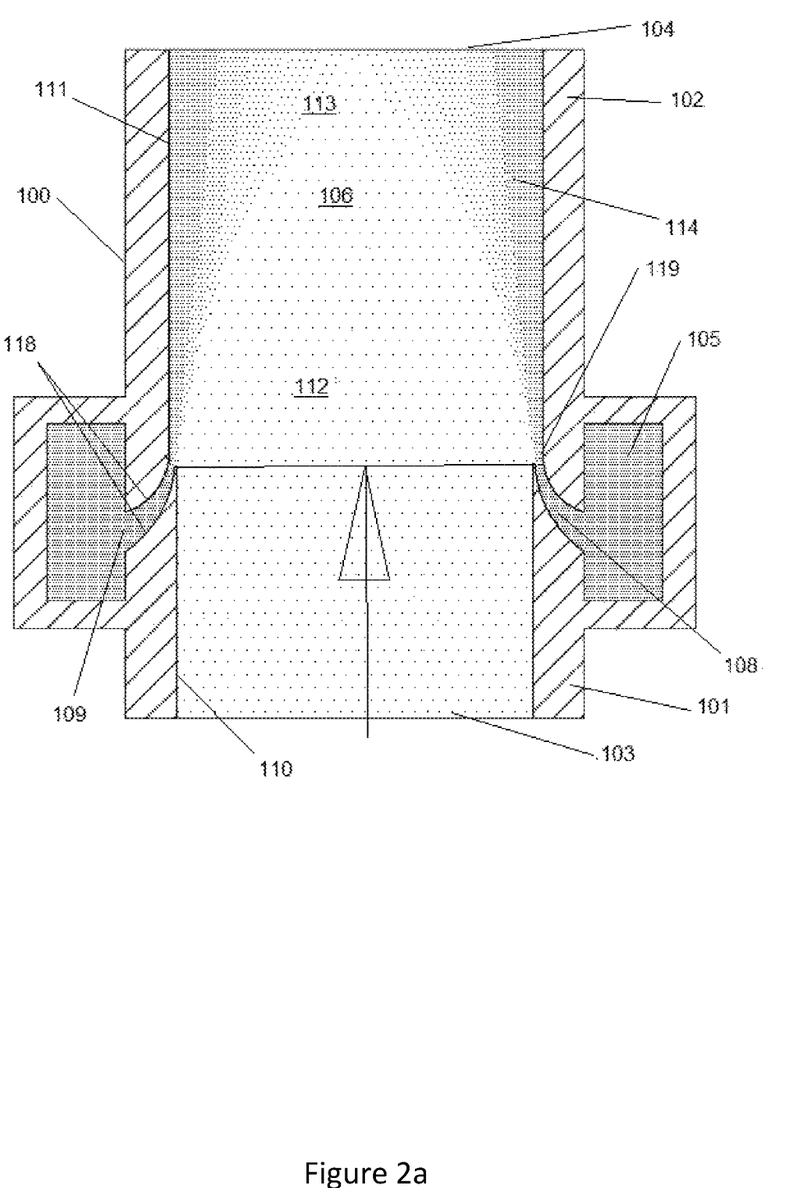
FIG. 2a is a basic illustration of the high speed water jet generator showing its internal configuration and principle of operation.
Figure 2B:
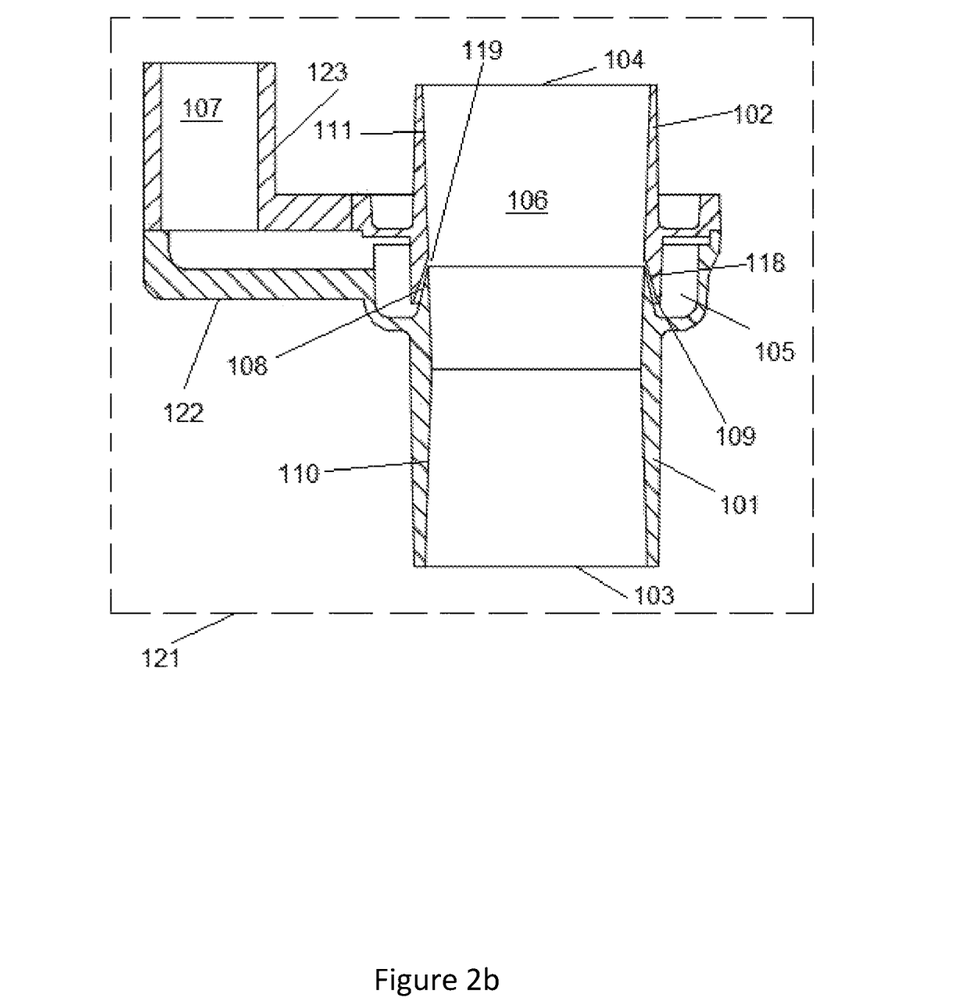
FIG. 2b is a sectional view of the high velocity water jet curtain generator as constructed by the preferred method.

To better describe the invention it is necessary first illustrate the hydrodynamic high speed jet curtain generator behind this novel pool debris removal device. FIG. 2a shows a cross sectional view for a simplified high speed water jet curtain generator and FIG. 2b shows a manufactured version of such high speed jet curtain generator. The generator body 100 is basically a tubular structure surrounded by a high pressure chamber 105. The generator body 100 has an inlet tube 101 and an outlet tube 102. The inlet tube 101 includes the generator body inlet port 103 and the outlet tube includes the generator body outlet port 104. The inlet tube 101 and the outlet tube 102 are delimited by a peripheral discharge nozzle 108. The peripheral discharge nozzle has a discharge outlet 119 in fluid communication within the internal walls 110 and 111 of the generator body 100, and an inlet area 109 in fluid communication with the high pressure chamber 105. The peripheral discharge nozzle 108 is delimited by a pair of walls 118. These walls 118 form a progressively reducing cavity around the inlet tube 101 and the outlet tube 102 which is designed to effectively transform the potential energy from the pressurized water in the high pressure chamber 105 into kinetic energy at the nozzle discharge area 119 with minimal friction losses and maximum efficiency. The nozzle 108 walls 118 are compound curved surfaces extending from the discharge area to the inlet area. In a simplified manner they are like concentric conical surfaces with different inclination. Since the main function of the peripheral discharge nozzle is to progressively transform pressure energy into velocity energy, the nozzle discharge area 119 is substantially smaller than the nozzle inlet area 109. The high pressure chamber 105 surrounds the generator inlet tube 101 and the outlet tube 102, and includes a high pressure chamber inlet 107. When high pressure water is introduced into the high pressure chamber 105, the water is forced to circulate evenly through the discharge nozzle 108. At the nozzle discharge area 119 the inlet water stream has reached the maximum velocity and it is discharged into the mixing chamber 106 as a thin high speed curtain of water 114 pointing towards the outlet port 104. The high speed jet curtain 114 impinges into the steady body of water and drags the steady water body 112 from the inlet port 103 into the mixing chamber 106 and progressively mixes with the stream entering the generator body 100. As the high speed jet curtain of water 114 leaves the nozzle discharge outlet 119, in the three dimensional space forms a conical stream of high speed water. The inner wall of the conical stream of water starts mixing with the surrounding steady water at the mixing chamber 106. As the two streams enter in contact, the steady water stream 112 starts gaining momentum, while the high speed jet curtain 114 starts loosing speed at the area of contact. This interaction cause the high speed jet curtain to start progressively diminishing the speed till there is a uniform water stream having a momentum equivalent to the energy diffused from the high speed jet curtain 114. After the mixing is complete an accelerated water stream 113 exits the generator body through the outlet port 104.

FIG. 2a illustrates the speed magnitude of the circulating water with variable shade density. Since water is an uncompressible fluid, the main design driver for the system is to conserve energy which is done by minimizing friction losses where possible, and applying hydrodynamic principles for conservation of momentum. The inlet tube 101 inside diameter is slightly smaller than the outlet tube 102 inside diameter. This difference allows the nozzle discharge outlet 109 to discharge the high speed water jet curtain 114 in the intended natural direction with the least interruption and losses while avoiding the Coanda's effect which in this application will reduce by friction the water jet curtain speed. The outlet diameter is maintained constant in order to maintain the mixed stream velocity at its peak to create maximum pressure velocity for a given maximum water flow through the inductor. If we relate to the equation of conservation of momentum to the device, the water flow times the speed of the water curtain, must be equal to the water flow times the speed at the outlet of the inductor, indicating that due to the limited amount of water supply and pressure, the cross sectional area of the inductor conduit must be limited to maintain the desired water flow and consequentially the speed. Such described principles were validated using fully functional prototypes and it was found that utilizing not more than 5 times the ratio water out/pressurized water in, the size of the conduit was reasonably within the range to gather and convey most of the typical bottom of the pool debris. Of course, the mixed water stream velocity and velocity pressure could have greater values as the ratio of total water circulation flow (GPM) to pressurized water flow is less than 5. As the skilled in the art may rationalize, this will substantially reduce the available opening for debris to pass through.

Figure 7:
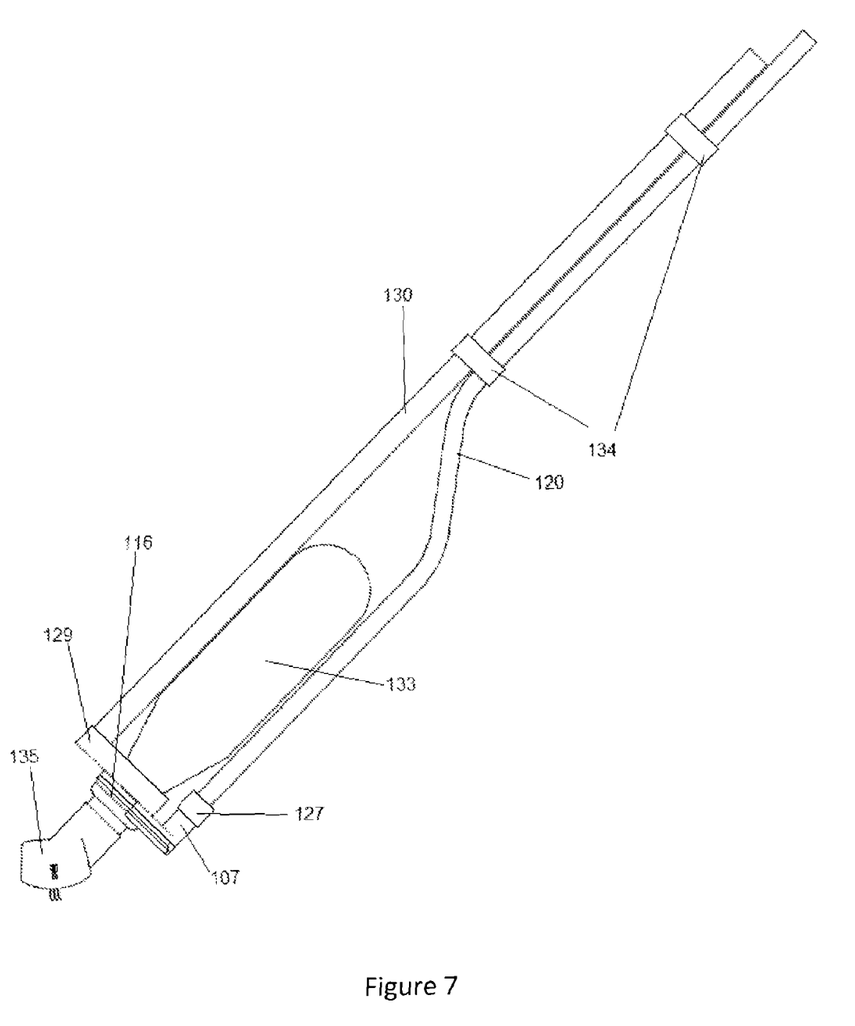
FIG. 7 is a perspective view of the pool cleaner object of the present invention where a garden hose is directly connected to the water curtain generator body, while the unit is held by a pole attached to the same body.

To configure the required elements in a way that provides the required functionality, facilitate manufacturing and lower cost it is best to use the plastic injection molding process to create the parts, which drives the specific parts design. Of course it is understood that subtle changes could be made on the design without departing from the basic philosophy and spirit of the invention. As such, FIG. 2b describes the same high velocity water jet curtain generator or water flow inductor as shown in FIG. 2a, as constructed in the preferred manufacturing process. In this configuration, the water flow inductor is comprised of a main housing 121, which replaces the basic generator body 100 described by FIG. 2a. The housing 121 is comprised of two plastic molded parts fused together. Of course, the skilled in the art is aware that the two parts can also be joined together by any other methods including fasteners, retaining clips, etc. One piece is the inlet module 122 and the other piece is the outlet module 123. These modules contain the necessary elements that when fused together all the basic elements and geometry described by FIG. 2a are maintained. After joined together these modules form the housing 121 which contains the high pressure chamber 105, the high pressure chamber inlet 107, the discharge nozzle 108 and all other features shown by the basic generator body shown by FIG. 2a. Since the nozzle outlet width has to be precisely controlled by concentricity and distance, the joining halves may contain spacing elements around the nozzle walls 118 (not shown) to assure the proper spacing for the nozzle discharge area 119. During prototype testing it was determined that the width of the nozzle discharge area 119 was in the order of 0.030 in. for the available water flow and pressure from a residential water faucet, reason why manufacturing precision is required to replicate model parameters without affecting performance. As part of an alternate embodiment, this nozzle discharge area 119 opening could be adjusted within a limited range to accommodate certain conditions. The housing 121 may also contain structures 129 to attach a holding pole 130 to the pool cleaner assembly 116 as shown by FIG. 7.

Figure 3A:
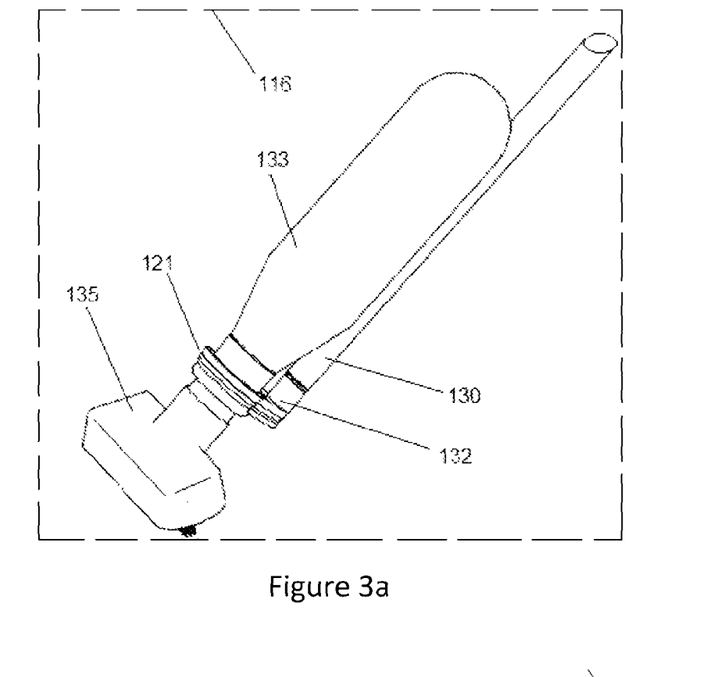
FIG. 3a is a perspective view of the device object of the present invention. In this view the device is configured with a high permeability debris catcher.
Figure 3B:
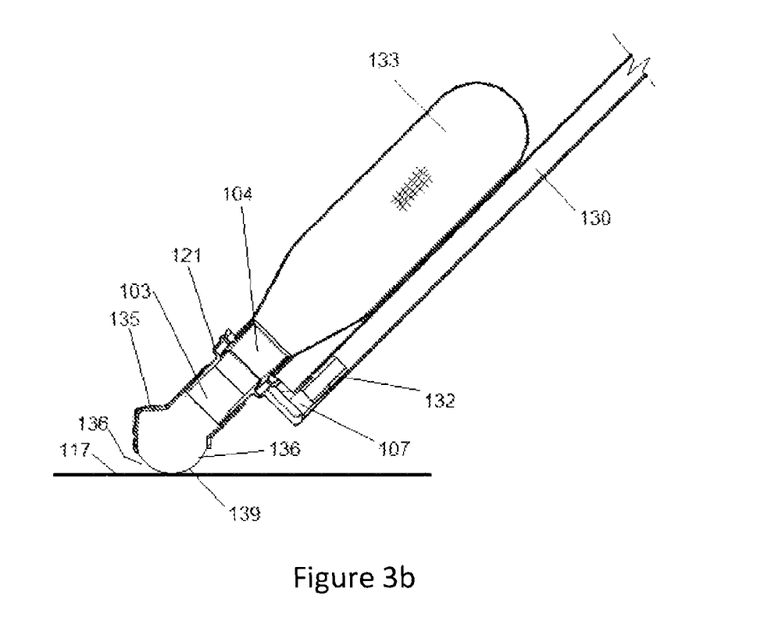
FIG. 3b represents a cross sectional view of FIG. 3a showing the internal configuration.
Figure 4A:
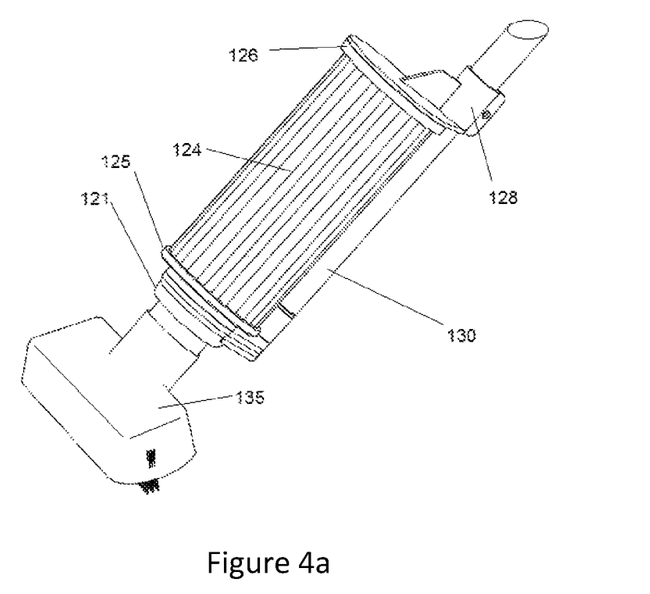
FIG. 4a is a perspective view of an alternate configuration for the device object of the present invention, where a micro-porosity standard water paper filter is attached to collect small size debris, dirt, and dead algae particles. Also this figure shows the use of a thin brush as nozzle-floor separator.
Figure 4B:
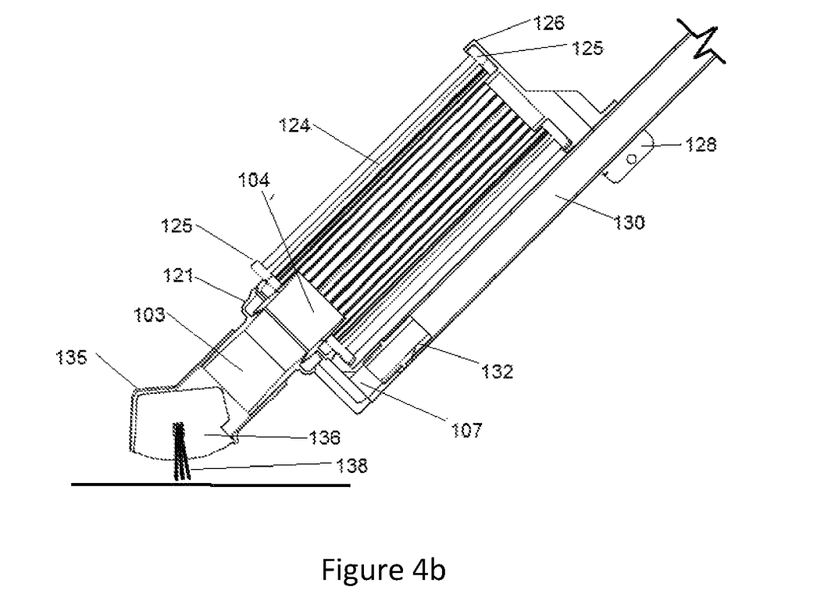
FIG. 4b is a sectional view of FIG. 4a showing internal configuration.

In order to efficiently gather the debris deposited at the bottom of a pool, the inlet of the pool cleaning device assembly 116, must be sufficiently wide to cover more surface area per sweep, and must contain bottom openings that allow sufficient water speed for picking up heavy debris. At the same time the opening must be large enough to prevent large size debris from blocking the inlets. Keeping those restrictions in mind, the flow generator 100, or housing 121, is coupled with a pickup nozzle 135 at the inlet port 103 as shown by FIGS. 3a 3b, 4a, and 4b. The nozzle 135 is designed in a way that water flow and velocity are not compromised. The nozzle 135 contains side spacers to slide the unit over the pool floor 117. These nozzle spacers 139 provide the required separation for the nozzle inlets 136 which maintains the water circulation between the nozzle inlet edge and the bottom of the pool at its maximum for optimal debris suctioning. Of course these nozzle spacers 139 are shown in FIG. 3b as part of a one-piece nozzle for simplicity and low cost, but they may be replaced by any other elements that provide the same function such as wheels or stiff brushes. In an alternate embodiment, the nozzle is built with a moderately stiff brush 138 in the center as shown by FIGS. 4a and 4b. The brush 138 provides the required nozzle edge separation and helps to remove debris stuck at the bottom of the pool. A debris retaining container 133 is typically attached to the housing outlet port 104, allowing the passage of water but not the debris. This debris retaining container is easily detachable to dispose the collected debris. In prior art similar cleaners the debris catcher container is a very permeable net, where the high permeability is very necessary due to the low pressure levels of their water inducting system. This is the reason why prior art bottom pool cleaners with similar structure cannot collect small debris such as rocks, sand, dead algae, and the like. The necessary small mesh to retain small debris will create on these prior art devices a backpressure which will drastically reduce the circulation speed and flow which will render the device ineffective.

Pool debris or solid contaminants are associated with the environment surrounding the pool, weather if it is indoor or outdoor, with vegetation or sand, with mud or rocks. This determines the kind of debris resting at the bottom of pools. When cleaning a pool with large debris a large and permeable reservoir is required for facilitate the job, on the other hand for small and heavy debris like rocks, sand, dead algae, and the like, small and close media reservoirs are the best choice. The hand-held cleaner object of the present invention is capable of using the typical low backpressure net for large debris, but also can be fitted with the typical paper filtration media used on high end pool filtration systems for retention of smaller debris without compromising the circulation velocity. This is possible thanks to the pressure velocity generated by the high speed water jet curtain 114 on the induced water flow. The alternate configuration described by FIGS. 4a and 4b, show how the basic large debris catcher could be replaced by a paper filter cartridge 124. The filter cartridge is held in place by a filter holder 126, which is adjustable by means of a collar 127. In the particular configuration as shown by FIGS. 4a and 4b, the paper filter holder 126 completely covers the cartridge upper side flange 125, to allow the use of standard paper filters cartridges. This method is only an illustrative example since many other configurations are possible for the utilization of low permeability filters.

Figure 6:
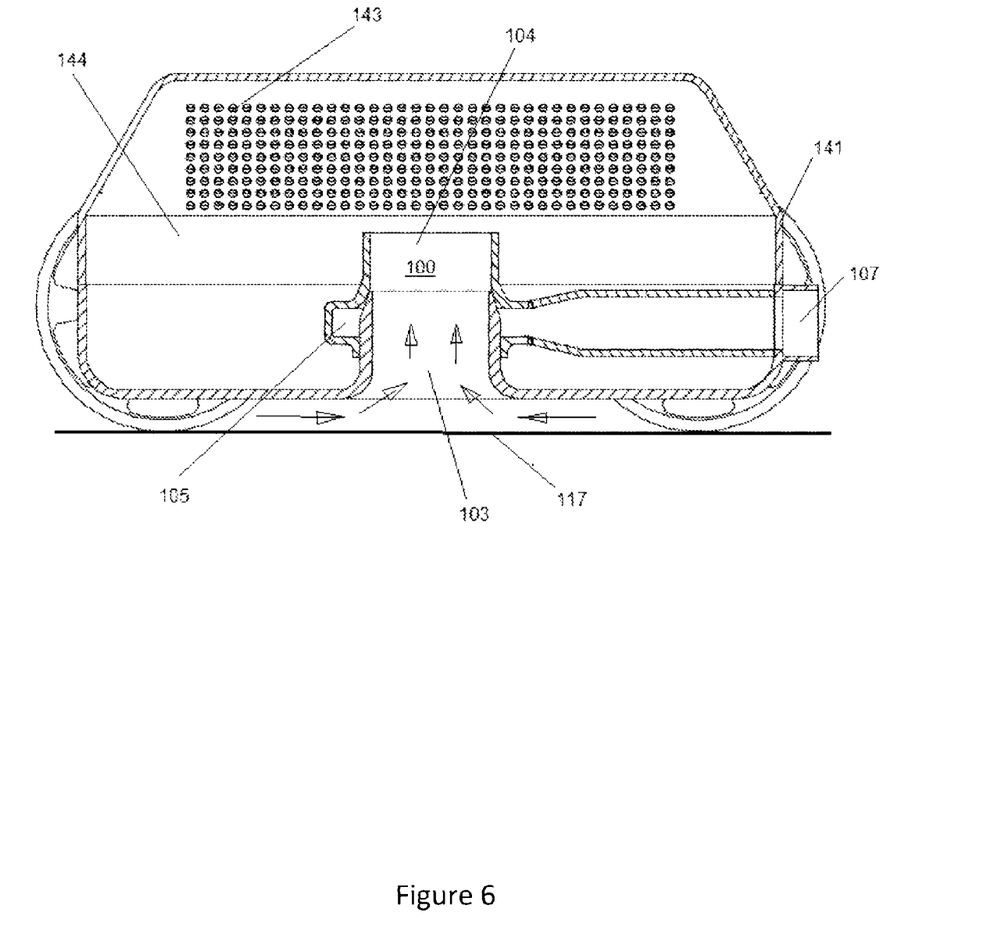
FIG. 6 is a cross sectional view of a typical pool robot using the water induction system object of the present invention.

In another embodiment of the present invention shown by FIG. 6, the high efficiency water jet curtain generator is used on an automatic pool cleaner commonly called "robot". These robots are driven by the pressurized water source from the pool pumping system, and collect the debris by inducing circulation under the frame of the robot separated from the bottom by wheels to allow water circulation and motion. The typical water induction system on these robots is by multi-jets and could be easily replaced by the high speed water jet curtain for added pickup power. FIG. 6 shows a very simplified cross section of a robot where the water inductor 100 object of the present invention is fitted to provide an enhanced water circulation for picking up heavy debris. We can see the same elements afore described such as the high pressure chamber 105, the inlet port 103, the pressurized water source connection 107, the outlet port 104, the debris chamber 144 and water exit holes 143 that are permeable to water but not debris. As depicted by FIG. 6, a circulation channel or pickup nozzle is formed between the robot housing 141 bottom and the pool floor 117. The water inductor 100 housing 121 is in this application configured in a way to adapt to the robot housing 141 configuration in order to facilitate manufacturing and reduce cost. The housing 121 is slightly different since the inlet tube 101 could be made as an integral part of the robot housing, while the outlet tube 100 is a separate component mechanically attached to the main robot assembly.

Figure 5:
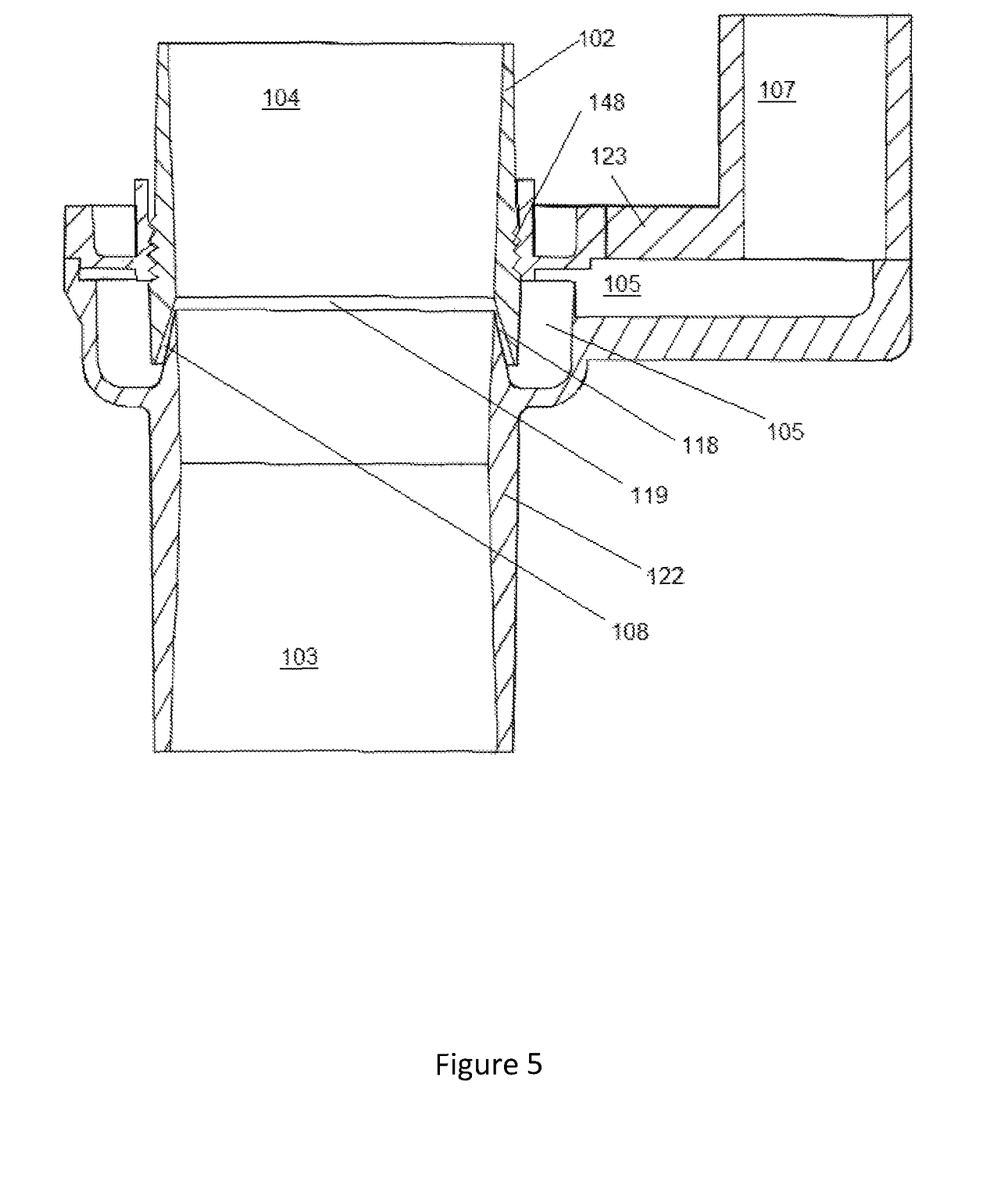
FIG. 5 represents the main body of the present invention with the threaded interface so the high velocity water curtain generator could be adjusted to various conditions to obtain maximum performance.

FIG. 5 shows the main housing 121 configured in a way to adjust the high speed water jet nozzle 108 cross sectional area, and allow optimization of the flow for different pressurized water conditions. In the case of a robot which runs out of the pool pressurized pump water with pressures not exceeding 20 psi, then the nozzle could be opened to provide a more efficient setup for the given conditions. In this configuration the outlet tube 102 is threaded into the outlet module 123 to allow longitudinal displacement of the outlet tube 102 relative to the inlet tube 101, therefore increasing or decreasing the high speed water jet nozzle walls 119 distance. By increasing or decreasing the nozzle walls 119 distance, the nozzle discharge area 119 is increased or decreased proportionally. For lower pressurized water supply pressures, increases on the nozzle discharge area 119 will maintain the necessary momentum and therefore optimized potential energy utilization.

Figure 8:
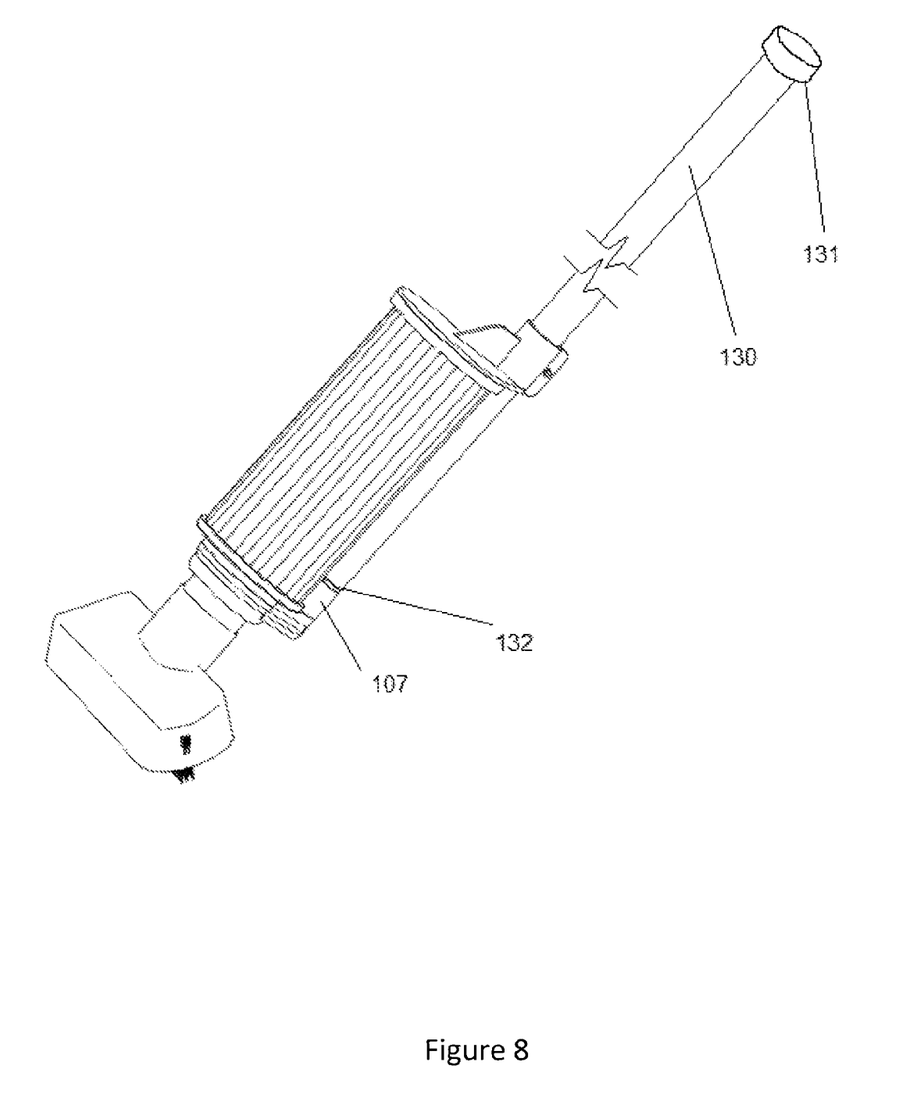
FIG. 8 is a perspective view of the hand held bottom of pool cleaning device object of the present invention showing a hollow pole with garden hose fitting attached to the end of it.
Figure 9:
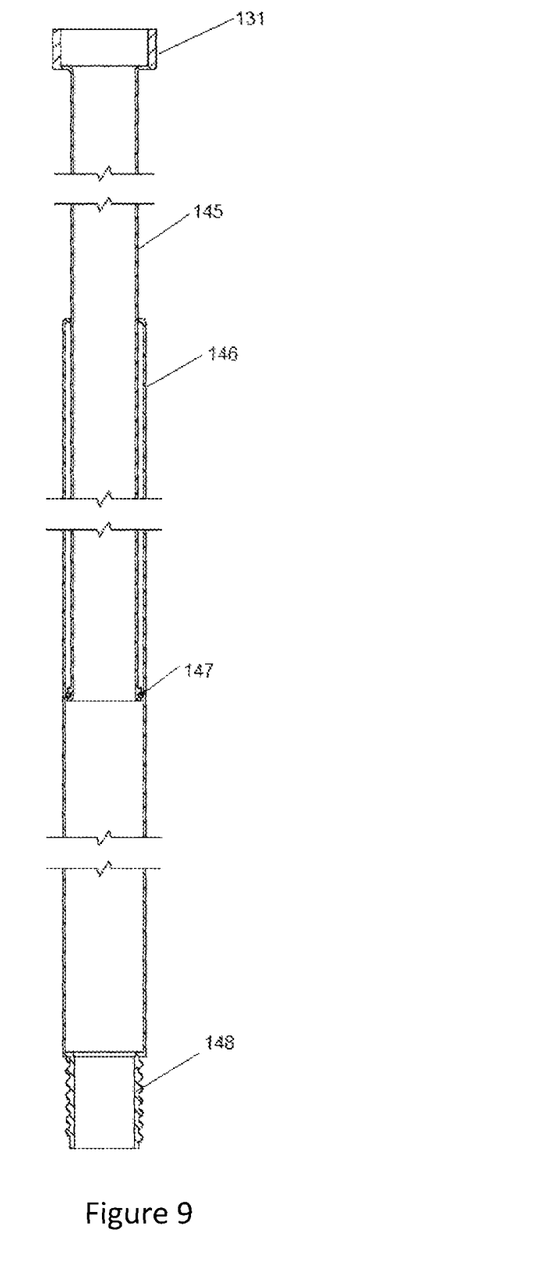
FIG. 9 is a section view for a telescopic water conduit or pole.

In the previous description it is obvious that the pressurized water supply source which is typically a residential water faucet could be connected directly to the body of the debris remover by a garden hose 120 as illustrated by FIG. 7. The garden hose is connected to the housing 121 by a hose fitting 127 in fluid communication with the high pressure chamber inlet 107. The body of the garden hose 120 is constrained to the holding pole 130 by hooks 134. In an alternate embodiment of the present invention shown by FIG. 8, the pressurized water source is attached to the end of the hollow holding pole 130 at the pole hose fitting 131 while the lower end of the pole 130 is attached to the housing 121 by the pole lower fitting 132 in fluid communication with the high pressure chamber inlet 107. The holding pole 130 is hollow and also used as a conduit for pressurized water. For easy storage it is preferred that the holding pole is built in a telescopic manner with proper seals at the joints. This is shown by FIG. 9. The telescopic pole 130 has an internal pipe section 145. This internal pipe section 145 slides into a pipe external section 146. Both pipe sections are sealed in the interface with a seal 147. At the end of the external pipe section 146 there are threads 148 to connect to the high pressure chamber inlet 107. The opposite end is connected to a typical water hose fitting 131. Another method to achieve the telescoping effect is an elastomeric hose inside the rigid sections of conduit which will extend as internal pressure increases. The pressurized water inside the hollow telescopic pole 130 will automatically extend the pole from its folded condition to its maximum length when in-use.

Since the high speed water jet curtain nozzle discharge outlet 119 is very small when compared to typical water jet openings used on similar devices, the nozzle outlet 119 is vulnerable to blockage by contaminant particles mixed with the pressurized water supply, hampering the device performance. A small in-line screen filter is used to prevent these unwanted particles from reaching the water curtain nozzle.

Many modifications and other embodiments of the invention set forth herein will come to mind to one skilled in the art having the benefit of the teaching presented in the foregoing description and associated drawings. While the above description contains many specificities, these should not be construe as limitations on the scope of the invention, but rather as an exemplification of one preferred embodiments thereof. Many other variations are possible. Specific structural and functional details described are not to be interpreted as limiting, but merely as basis for the claims and as a representative basis for teaching to the skilled in the art the basic form of the invention and potential variations.

Example many different configurations of inlet nozzles are possible, as well as many different ways to configure the filtration media structure and fixation system. Also modifications are possible for the tubular structure of the water inductor in which different close loop shapes or slightly interrupted loops could be utilized to apply the same principles and embodiments illustrated thereof.

What is claimed is:
1. A pool debris retrieving device comprising:
a high speed water jet curtain generating device;
a debris collecting filter;
said high speed water jet curtain generating device powered by an external source of high pressure water, wherein said high speed water jet curtain generating device induces a stream of water mixed with debris through a conduit; said conduit having an inlet opening and an outlet opening; said conduit having disposed within the internal wall a continuous peripheral nozzle in fluid communication with a high pressure water reservoir; said stream of water mixed with debris exits said conduit through said outlet opening, into said debris collecting filter; said debris collecting filter being a water permeable container.

2. The pool debris retrieving device of claim 1, wherein the pool debris retrieving device is held by a pole to allow a human to maneuver the device around the pool surface.

3. The pool debris retrieving device of claim 1, wherein said debris collecting filter is a paper filter cartridge.

4. The pool debris retrieving device of claim 1, wherein a debris pickup nozzle is attached to said inlet opening of said conduit; said debris pickup nozzle having an inlet window area substantially larger than said conduit inlet opening; said debris pickup nozzle having structures to maintain a predetermined distance from said inlet window to the pool floor, wherein said predetermined distance creates a cross sectional area between said nozzle inlet perimeter and the pool floor for the water to flow through with the necessary speed to pick up and convey debris from the pool floor.

5. The pool debris retrieving device of claim 4, wherein said means to maintain a predetermined distance from the inlet window to the pool floor are wheels.

6. The pool debris retrieving device of claim 2, where said pole is a water conduit.

7. The pool debris retrieving device of claim 6, wherein said pole is a telescopic water conduit.

8. A waterborne debris removing device comprised by:
a water inducing conduit;
a debris collecting filter;
said conduit having an inlet opening and an outlet opening; disposed within the internal wall of said conduit, is a closed loop continuous nozzle; said closed loop continuous nozzle to discharge a high speed water curtain into the internal periphery of said conduit in the direction of said outlet nozzle; wherein said high speed water jet curtain induces a stream of water through said conduit when it is submerged into a body of water.

9. The waterborne debris removing device of claim 8, wherein a debris pickup nozzle is in fluid communication with said conduit inlet opening for converging said stream of water through said conduit; said debris pickup nozzle having an inlet window area substantially larger than said conduit inlet opening; said debris pickup nozzle having structures to maintain a predetermined distance from said inlet window to the pool floor, wherein said predetermined distance creates a cross sectional area between said nozzle inlet perimeter and the pool floor for the water to flow through with the necessary speed to pick up and convey debris from the pool floor.

10. The waterborne debris removing device of claim 8, having structures for a human to remotely locate and control motion of said water debris collecting device inside a body of water.

11. The waterborne debris removing device of claim 8, wherein said debris collection filter is a permeable media to hold debris 20 microns or greater in size.

12. The waterborne debris removing device of claim 10, where said means for a human remotely locate and control motion of said water debris collecting device is a pressurized water conducting pole.

13. The waterborne debris collecting device of claim 8, wherein said debris collection filter is a paper filter cartridge.

14. A water induction system comprised by:
a conduit;
a peripheral continuous nozzle;
a high pressure reservoir;
said conduit having an inlet opening, internal walls and an outlet opening; said peripheral continuous nozzle disposed within said conduit internal wall; said high pressure reservoir to evenly distribute a flow of pressurized water around said peripheral continuous nozzle; said peripheral continuous nozzle delimited by two walls; a first wall being a truncated conical surface with an angular inclination in the direction of said conduit outlet opening; a second wall substantially concentric to said first wall; said second wall being a truncated conical surface with an angular inclination in the direction of said outlet opening; said first and second walls forming a circumferential cavity; said circumferential cavity delimited by said conduit internal wall and said high pressure reservoir; wherein said intersection of said truncated conical walls with said conduit internal wall creates said peripheral continuous nozzle which transforms said external pressurized flow of water into a high speed water jet curtain within the internal volume of said conduit; said high speed water jet curtain to impinge into a steady body of water creating an induced water flow through said conduit internal volume.

15. The water induction device from claim 14, wherein the separation of said peripheral continuous nozzle conical walls at said intersection with said conduit internal wall is less than 0.040".

16. The water induction device from claim 14, wherein the separation of said peripheral continuous nozzle conical walls at said discharge area is adjustable.

17. The water induction device from claim 14, wherein the inclination of said first and second conical walls is between 45 and (zero) degrees in relation to the internal walls or axis of said conduit.

18. The water induction device from claim 14, wherein the inclination of the first truncated conical wall in relation with the inclination of the second truncated conical wall is greater than zero degrees.

19. The water induction device from claim 14, wherein the device is manufactured joining two separate pieces.

* * * * *